(12) United States Patent
Giuffré

(10) Patent No.: US 6,695,355 B1
(45) Date of Patent: Feb. 24, 2004

(54) PIPE FITTING ELEMENT PARTICULARLY FOR PLASTIC PIPES

(75) Inventor: Carmelo Giuffré, Capo d'Orlando (IT)

(73) Assignee: Irritec S.r.l., Capo d'Orlando (IT)

( * ) Notice: Subject to any disclaimer, the term of this patent is extended or adjusted under 35 U.S.C. 154(b) by 0 days.

(21) Appl. No.: 09/869,424

(22) PCT Filed: May 24, 2000

(86) PCT No.: PCT/EP00/04727

§ 371 (c)(1),
(2), (4) Date: Aug. 14, 2001

(87) PCT Pub. No.: WO01/31243

PCT Pub. Date: May 3, 2001

(30) Foreign Application Priority Data

Oct. 27, 1999 (IT) .......................... SV99A0034

(51) Int. Cl.[7] ................................ F16L 33/00
(52) U.S. Cl. ...................... 285/255; 285/245
(58) Field of Search .................. 285/255, 245, 285/246, 247, 342, 353, 354

(56) References Cited

U.S. PATENT DOCUMENTS

| | | | | | |
|---|---|---|---|---|---|
| 178,649 | A | * | 6/1876 | Loftus | 285/245 |
| 2,453,813 | A | * | 11/1948 | Prince | 285/354 X |
| 3,408,099 | A | * | 10/1968 | Appleton | 285/247 X |
| 3,606,396 | A | * | 9/1971 | Prosdocimo et al. | 285/148.18 |
| 3,885,819 | A | * | 5/1975 | Egerer et al. | 285/255 X |
| 4,021,061 | A | * | 5/1977 | Zimmerman | 285/255 X |
| 4,278,279 | A | * | 7/1981 | Zimmerman | 285/255 |
| 4,564,222 | A | * | 1/1986 | Loker et al. | 285/255 X |
| 4,577,894 | A | * | 3/1986 | Wake | 285/255 X |
| 4,749,217 | A | | 6/1988 | Causby et al. | |
| 4,790,569 | A | * | 12/1988 | Chaffee | 285/255 X |
| 5,261,706 | A | * | 11/1993 | Bartholomew | 285/255 |
| 5,332,269 | A | * | 7/1994 | Homm | 285/39 |
| 5,370,424 | A | * | 12/1994 | Wendorff | 285/332.4 |
| 5,622,393 | A | | 4/1997 | Elbich et al. | |
| 6,231,085 | B1 | * | 5/2001 | Olson | 285/255 X |
| 6,419,417 | B1 | * | 7/2002 | Zigliotto | 285/255 |

FOREIGN PATENT DOCUMENTS

| | | |
|---|---|---|
| BE | 535526 | 2/1955 |
| FR | 1141189 | 8/1957 |
| FR | 1267065 | 11/1961 |
| GB | 1301057 | 12/1972 |

* cited by examiner

Primary Examiner—David Bochna
(74) Attorney, Agent, or Firm—James Creighton Way; Meera P. Narasimhan

(57) ABSTRACT

A pipe fitting element comprises a tubular fit-in sleeve (1) which can be fitted into an end of a pipe (2) to be connected, and a clamping ring nut (10), coaxial to the sleeve (1). The pipe (2) is arranged to be clamped by tightening the ring nut (10) on the sleeve (1) and translating it towards the pipe (2) while drawing two clamping surfaces (5, 13) mutually closer. One of the surfaces is situated on the outer surface of the sleeve (1) and the other situated on the inner surface of the ring nut (10). These clamping surfaces (5, 13) consist of progressive widening (105, 113) of the outside diameter of the sleeve (1) and of the inside diameter of the end of the ring nut (10) turned towards the pipe (2). A pipe joint, which has at each end a pipe fitting element of the above described type is also provided.

106 Claims, 7 Drawing Sheets

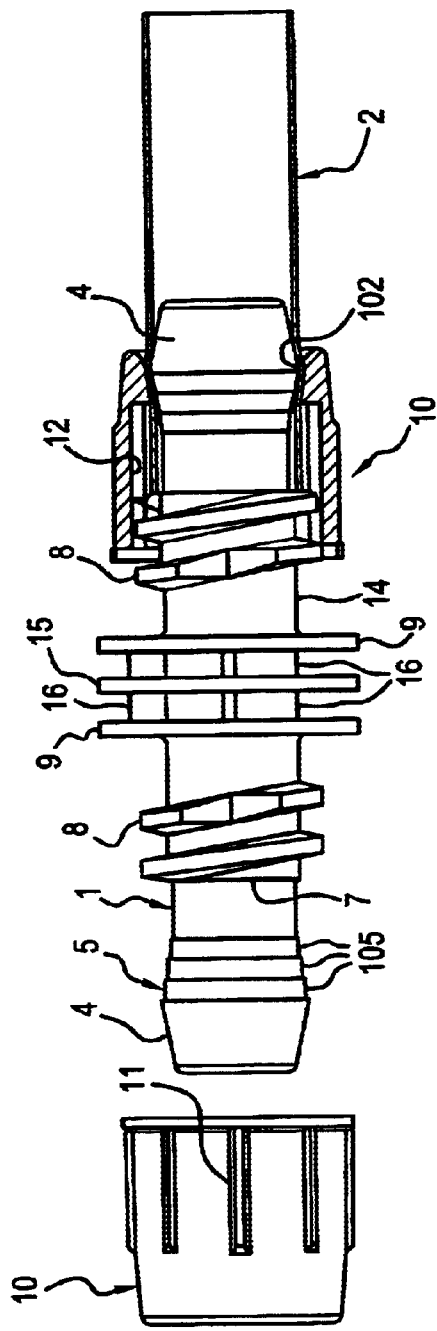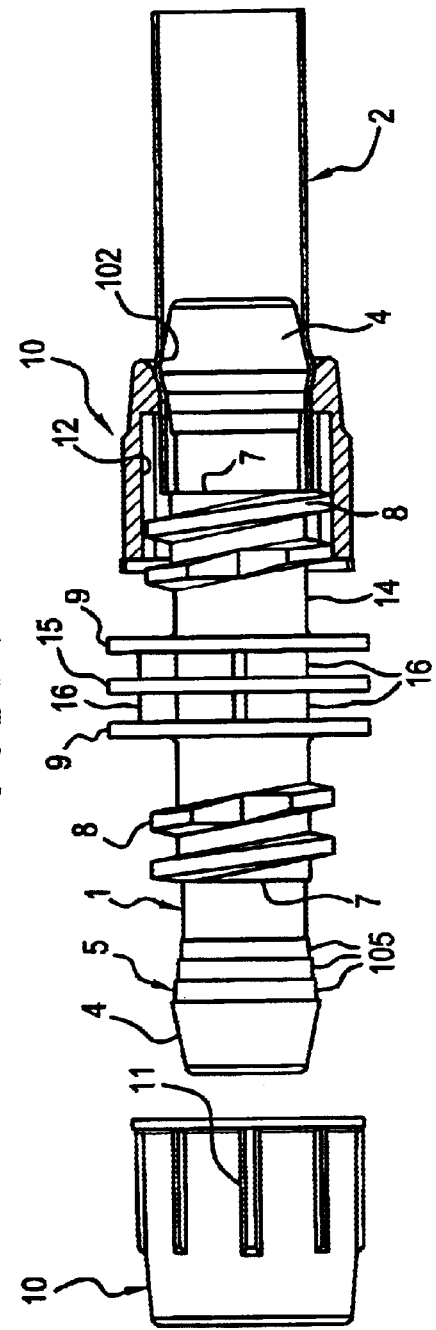

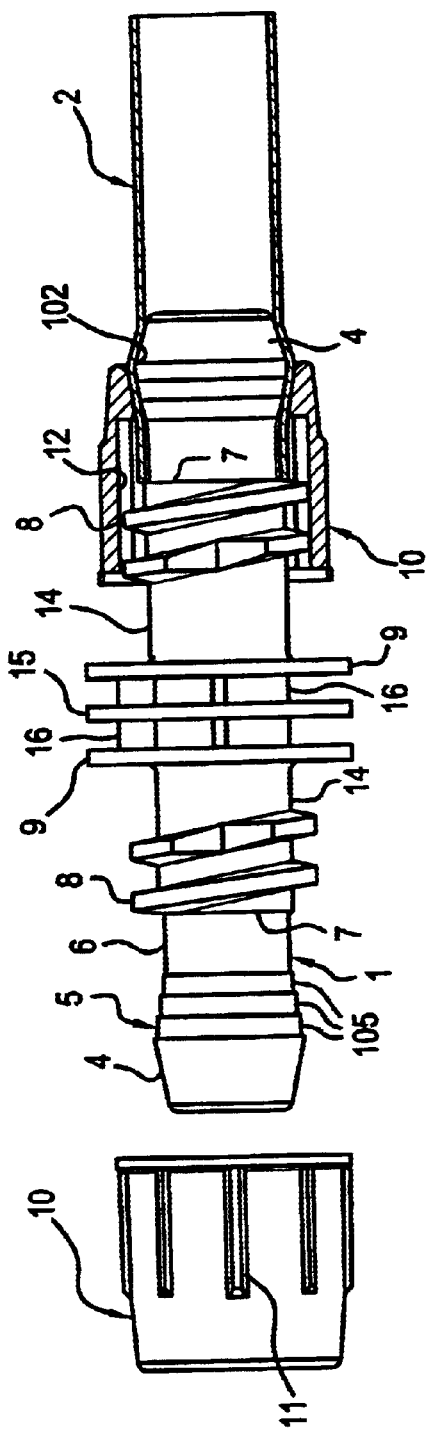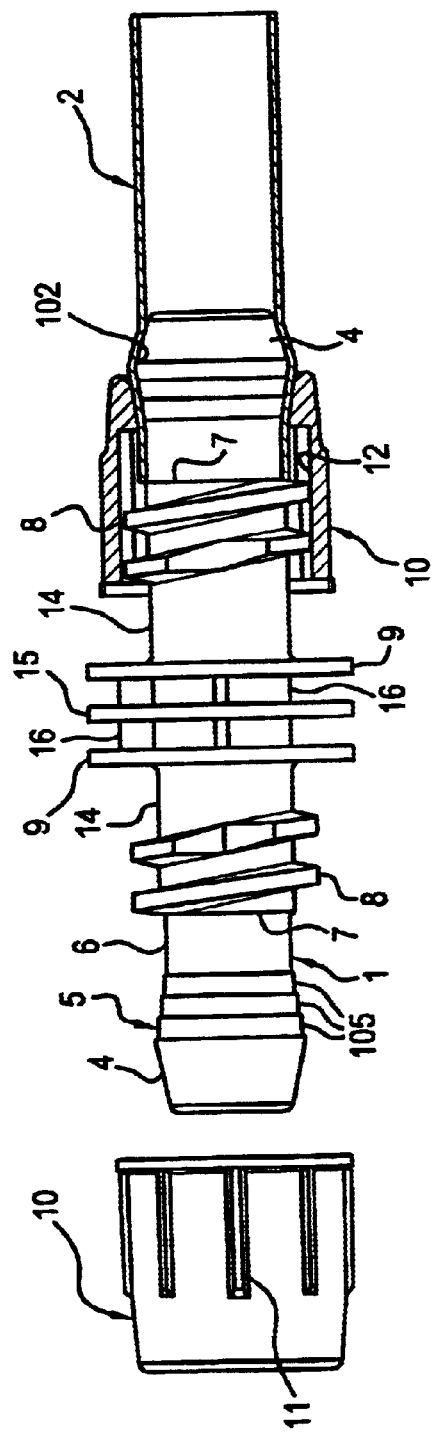

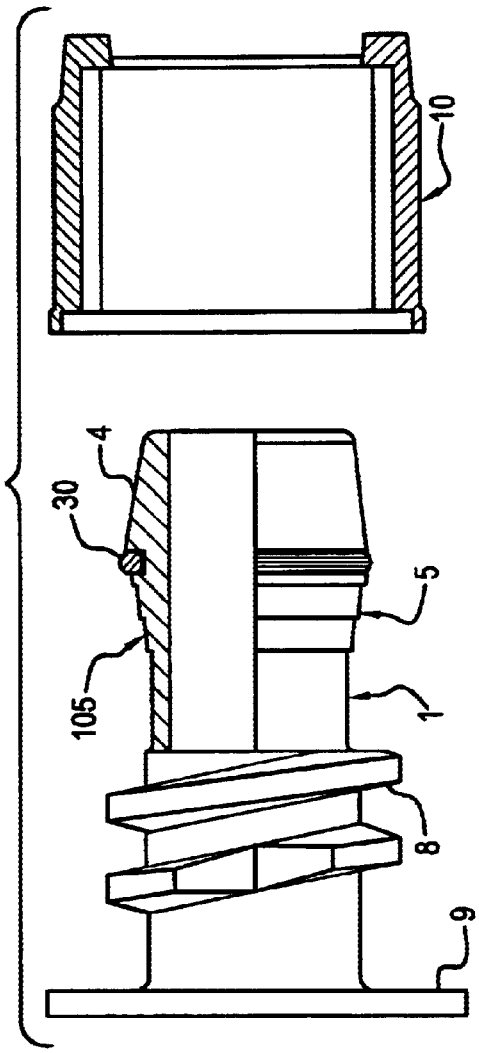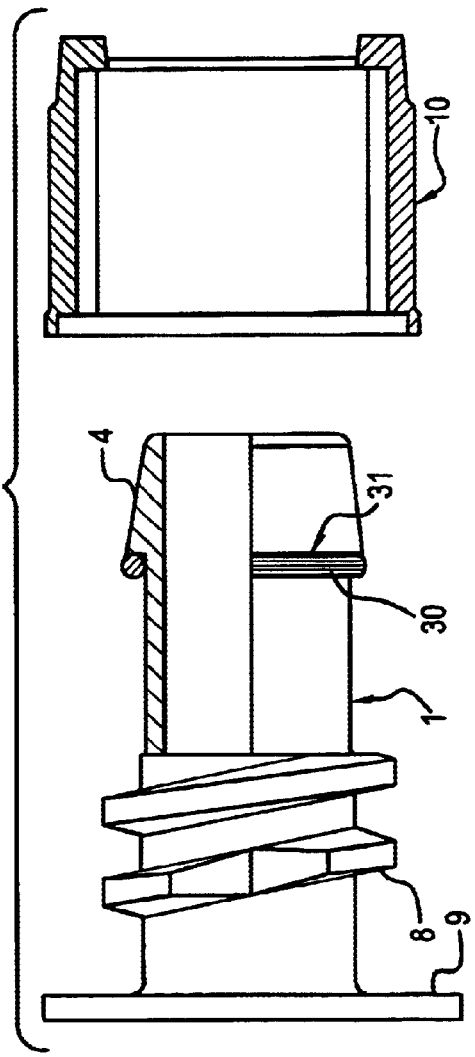

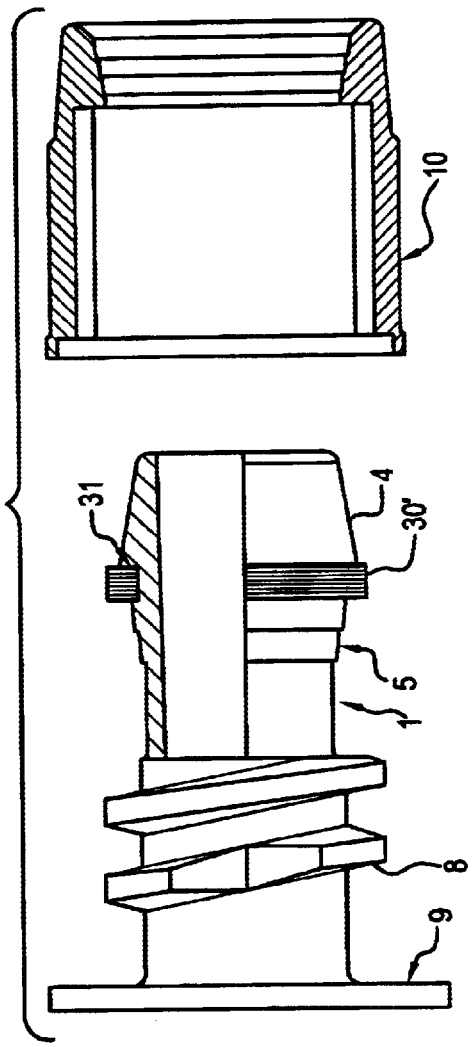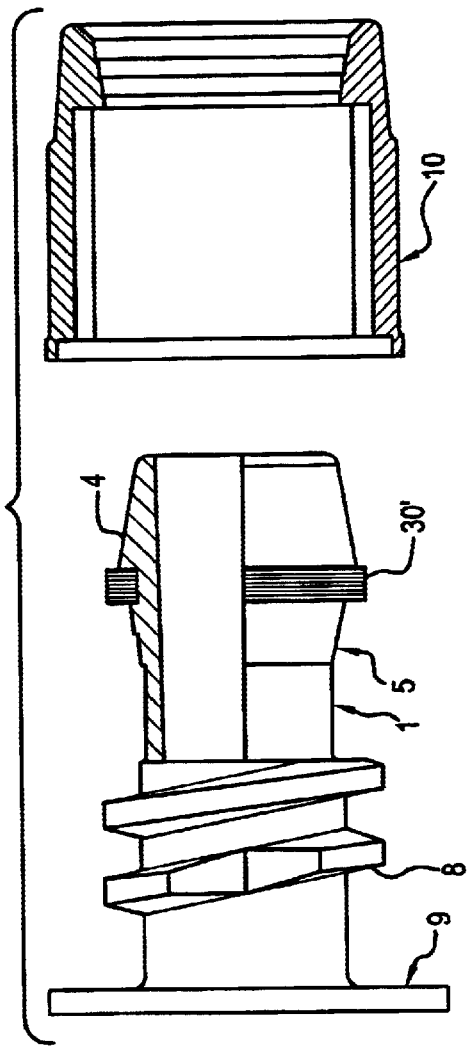

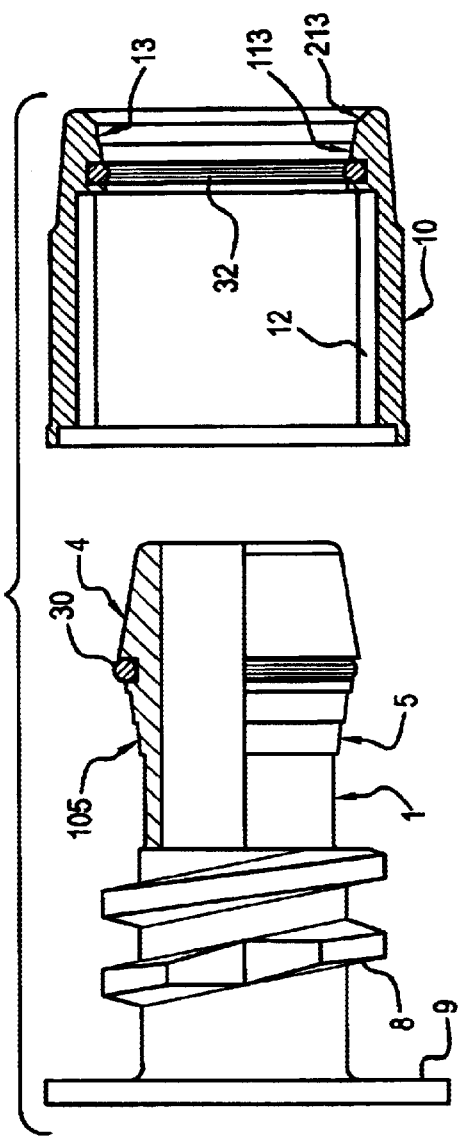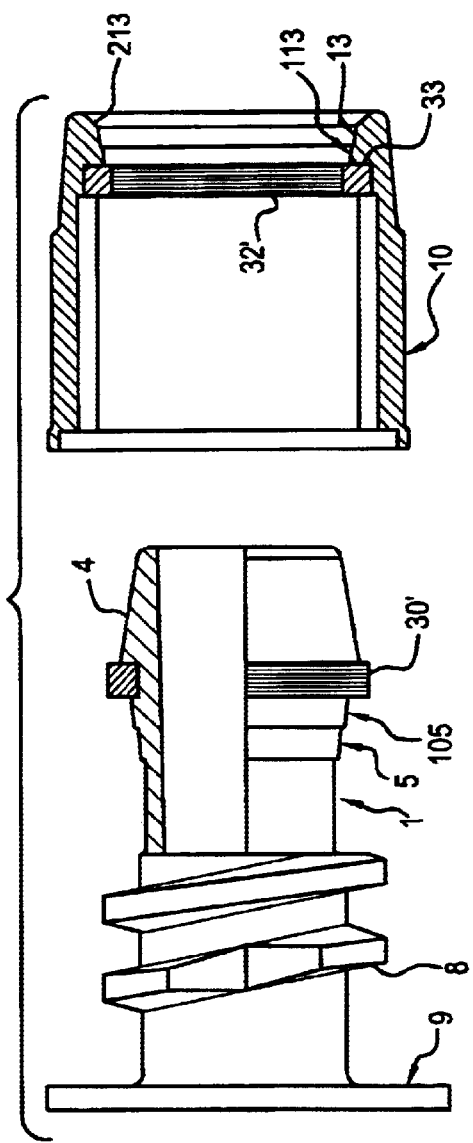

PIPE FITTING ELEMENT PARTICULARLY FOR PLASTIC PIPES

BACKGROUND OF THE INVENTION

The invention relates to a pipe fitting element, particularly for plastic pipes, comprising a tubular fit-in sleeve or the like, which can be fitted into an end of a pipe section to be connected, and a clamping ring nut, coaxial to the sleeve and having an internal thread, for cooperating with a matching external thread on at least one part of the sleeve, both the ring nut and the tubular sleeve having facing surfaces for tightly clamping the pipe and for mechanically restraining the pipe onto the tubular sleeve; the clamping surface provided on the tubular sleeve being in contact with the inner wall of the pipe, and the clamping surface provided inside the ring nut being in contact with the outer wall of the pipe, when the pipe fitting element is in the mounted condition; and said threads being such that the pipe is clamped by tightening and further translating the ring nut towards the end of the tubular sleeve inside the pipe and by simultaneously drawing the two clamping surfaces mutually closer.

Pipe fitting elements of the above described type are known, which find application in the connection or union of pipes, lines, devices or components of hydraulic or pneumatic systems. Particularly, these well-known pipe fitting elements find application in plastic pipe connection for irrigation systems or the like.

In these known pipe fitting elements, the mutually facing clamping surfaces provided on the outer surface of the sleeve and on the inner surface of the ring nut generally have each an annular step. This step typically consists of an annular cylindrical narrowing of the outside diameter of the sleeve, usually situated immediately upstream, with respect to the tightening direction, of a pipe lead-in section at the sleeve end turned towards the pipe to be connected, and of a corresponding widening of the inside diameter of the ring nut end turned towards the pipe. During the clamping operation, after inserting the sleeve into the pipe end, by tightening the ring nut, the latter is translated towards the pipe, the two clamping surfaces are drawn mutually closer and the pipe is tightly secured, also due to the gripping action exerted by the two steps on the inner and outer surfaces of the pipe to be connected.

Although these known pipe fitting elements can effectively achieve their purpose, they have a few serious drawbacks. Typically, the steps provided on the clamping surfaces of the ring nut and of the sleeve have a considerable radial projection, whereby the pipe is strongly deformed upon clamping. Hence, said pipe must be made from a highly deformable material to prevent fluid tightness problems or even ruptures of the pipe. Tightness is a critical problem, and the operator can run the risk of excessively tightening the ring nut and of damaging the pipe. Further, these known pipe fitting elements have a very poor adaptability to different pipe thicknesses, hence a pipe fitting element with specific dimensional features must be provided for each pipe wall thickness and for each pipe diameter.

SUMMARY OF THE INVENTION

Therefore, the invention has the object to allow, by simple and inexpensive means, the provision of a pipe fitting element of the above described type, allowing a tight, non-unthreadable connection, with an end of a pipe to be connected, having at least equal, or even better characteristics than prior art pipe fitting elements, and further allowing effective clamping of the pipe, while avoiding an excessive deformation thereof. A further object is to allow the provision of a so-called "multifit" pipe fitting element, i.e. able to be used, with no ring nut or sleeve replacement, for connection of pipes having different thicknesses, without requiring, like prior art ones, a joint with different characteristics based on the thickness of the pipe in use.

The invention achieves the above purposes thanks to a pipe fitting element of the above described type wherein said clamping surfaces consist of progressive widenings of the outside diameter of the fit-in tubular sleeve and of the inside diameter of the ring nut end turned towards the pipe to be connected.

These widenings of the outside diameter of the tubular sleeve and of the inside diameter of said ring nut end may be progressive in the ring nut tightening direction.

Hence, the pipe may be clamped between two annular surfaces, one in the ring nut and the other in the tubular sleeve at said progressive diameter widenings.

These progressive widenings of the tubular sleeve and of the inner surface of the ring nut may have such a progression as to form clamping surfaces having a substantially conical shape or similar. In other words, these clamping surfaces, regardless of their conformation, may have substantially conical enveloping surfaces.

The clamping surfaces provided on the tubular sleeve and inside the ring nut may be tapered in the same direction, i.e. widening towards the end of the pipe.

Advantageously, the clamping surfaces may have different tapering directions.

Further, they may have diverging tapering directions, i.e. the clamping surface provided inside the ring nut may be less steep than the clamping surface provided on the tubular sleeve. By this arrangement, as the thickness of the pipe to be connected increases, clamping between the ring nut and the sleeve may occur at decreasing diameters of the two clamping surfaces, hence different portions both of the ring nut and of the sleeve adhere to the pipe.

At least one of the two clamping surfaces may consist of a succession of step-like widenings, but considerable advantages are obtained if both clamping surfaces of the tubular sleeve and of the clamping ring nut consist of step-like widenings. These steps provide an effective grip on the pipe walls and effectively prevent unthreading thereof. Further, the progression of the step-like widenings ensures a progressive clamping of the pipe, which is thus gradually, but firmly secured, while avoiding the excessive deformations that occur when using prior art pipe fitting elements having a single step with a considerable radial projection.

These steps may be equal or different in number along the same axial length, in radial projection and in radial length.

According to a preferred embodiment of the invention, the step-like widenings provided on the two clamping surfaces consist of a plurality of annular surfaces having the shape of cylinders or of truncated cones, with equal or different taperings.

In accordance with a preferred embodiment, the clamping surface provided on the tubular fit-in sleeve may consist of a plurality of annular surfaces having the shape of cylinders or of truncated cones with equal axial lengths and steepness, whereas the clamping surface provided inside the ring nut may consist of a plurality of annular surfaces having the shape of cylinders or of truncated cones with equal axial lengths and, at least partially, with a decreasing steepness in the tightening direction. Thanks to the above characteristics the clamping surface inside the ring nut is less steep than the clamping surface provided outside the sleeve, as desired.

The end portion of the ring nut turned towards the tightening direction may have a widening flare to facilitate the insertion of the end of the pipe to be connected into the ring nut. This ring nut may have, on the pipe insertion end, a diameter substantially identical to the outside diameter of the pipe threaded on the tubular sleeve and/or slightly greater than said outside diameter of the pipe.

The maximum diameter of the tubular sleeve may be slightly smaller than the minimum diameter of the clamping ring nut, so as to allow insertion of the ring nut on the tubular sleeve from the end of the tubular sleeve turned towards the pipe to be connected. According to an advantageous variant, the maximum diameter of the tubular sleeve is not smaller than the minimum diameter of the ring nut, but slightly greater, within the limits the material has for the passage of the ring nut over the widening of the sleeve. Depending on the material in use, the differences between the maximum diameter of the sleeve and the minimum diameter of the ring nut are such that a slight interference between the sleeve and the ring nut is provided, which is to be overcome when the ring nut is placed in the operating position. This slight interference between the sleeve and the ring nut is advantageous to allow a mechanical and tight clamping even of very thin pipes.

The tubular sleeve may have an abutment or end-of-stroke surface for the inserted pipe, consisting of a step-like widening or of an annular radial shoulder.

This annular radial shoulder, as will be apparent from the description of the annexed drawings, may be provided between the origin of the clamping surface provided on the tubular sleeve and the origin of the threaded portion provided on the tubular sleeve, preferably in the vicinity of the latter.

Advantageously, the tubular sleeve may have, at the end turned towards the pipe to be connected, a tapering portion to form an outward lead-in area facilitating the insertion of the sleeve into the pipe.

Alternatively thereto or in combination thereof, the clamping surfaces provided on the tubular sleeve and inside the ring nut may have each, at least partially, a concave or convex shape, with equal or different concavities/convexities, and with the same or different directions.

The pipe fitting element which forms the subject of the present invention may have many different applications, and particularly it may be made of one piece or applied or screwed or clamped in any other manner to the inlet and/or outlet of a line or of a device or of a hydraulic or pneumatic component, such as a cock, a valve, a counter, or the like.

Moreover, the tubular sleeve may have, at the end opposite to the one inserted in the pipe to be connected, different means for coupling it to the inlet of a line, or of a device or of a component of hydraulic or pneumatic systems, for instance to allow quick disconnection of the pipe from the line.

According to a variant embodiment of the invention, the clamping surface inside the ring nut may be defined by a continuous surface having a helical form with a progressively decreasing diameter.

This is applicable both with conical and cylindrical surfaces, as well as with step-like progressive narrowings. In this case, a continuous helical step is provided, with a progressively decreasing diameter, particularly in the direction opposite to the pipe to be clamped.

It may be arranged that the helical surface has a variable pitch or that a multiple helical surface is provided in the form of a multi-start thread.

The left- or right-hand thread is selected in accordance with the thread for coupling the ring nut to the sleeve and in such a manner that, when the ring nut is tightened on the sleeve, the helical clamping surface is also tightened on the pipe to be clamped.

According to a variant of this embodiment, the clamping surface inside the ring nut may also consist of an internal cylindrical or conical thread.

This thread may have a helical tooth with any section.

The thread may have a variable pitch.

The thread may also be of the multi-start type.

The pipe fitting element which forms the subject of the present invention may find advantageous application in providing a joint for connecting the free ends of two pipe segments, typically comprising a straight or curved cylindrical body. According to the invention, this tubular body may have, at each end, a pipe fitting element like the one described herein and the tubular sleeves of each pipe fitting element may be parts of the tubular body, or extensions thereof.

Advantageously, this joint may include grasping and/or end-of-stroke means for the ring nut in the unscrewed/opened condition.

These means may consist of at least one annular radial flange or shoulder provided in the central part of the tubular body between the two pipe fitting elements.

The tubular sleeves of the two pipe fitting elements may have equal maximum outside diameters, for connection to pipe ends with equal diameters, or may have different maximum outside diameters, so that pipes with different diameters may be connected (reducing pipejoint).

In accordance with a further variant of the invention, the pipe fitting element may have at least one gasket on the tubular sleeve, for cooperation with the inner surface of the pipe fitted onto the sleeve.

Alternatively, the gasket may be provided in the inner surface of the ring nut and cooperate with the outer surface of the pipe coupled to the pipe fitting element.

Both the tubular sleeve and the clamping ring nut may be also arranged to have sealing gaskets cooperating with the inner and the outer surfaces respectively of the pipe coupled to the pipe fitting.

The gasket/s may be of any type, either with a polygonal, e.g. square section, and with a round section, such as a O-ring or the like.

A preferred embodiment provides at least one gasket on the tubular sleeve in the connection part or annular apex between the end taper and the adjacent clamping surface, there being provided an annular groove for accommodating the gasket in that part.

In this case, the gasket may form the step for passage to the annular surface with the maximum diameter of the clamping surface of the tubular sleeve.

In the ring nut, the gasket is advantageously situated in the end portion opposite to the end of the tubular sleeve.

In this portion, a step-like narrowing may be provided, against which the gasket abuts axially, or in said narrowing an annular groove for accommodating the gasket may be formed.

According to another variant, the gasket may form itself the clamping surface of the tubular sleeve, thereby replacing the conical or step-like widening portion at the end of the tubular sleeve.

The presence of the gasket is particularly advantageous when the pipe fitting according to the invention is used in combination with pipes having uneven wall thicknesses, e.g. pipes obtained by axially winding a tape and sealing two overlapping edges thereof. These pipes are known with the name of "tape" pipes, which are sold, for instance, by Nelson.

The pipe fitting element in accordance with the present invention also allows the provision of a joint for connecting two, three or more free ends of pipe segments, particularly made of plastic. In this case, the joint may have two, three or more pipe fitting elements according to the invention, whose tubular sleeves are stably connected or connectable to each other, and may have equal or different maximum diameters.

Additionally, there may be provided a joint for connection between an end of a pipe, particularly made of plastic, and a threaded end of a pipe, particularly made of metal. In this case, the tubular body may have a threaded end with a traditional thread, whereas the other end may include a pipe fitting element according to the invention.

The above description clearly shows the advantages of the present invention, which consist in that a pipe fitting element of the above described type may be provided, which allows an effective connection and sealing of pipes, particularly made of plastic. These pipes may be clamped between the walls provided on the clamping element without being excessively deformed, thereby avoiding the above mentioned drawbacks like fluid leakage and pipe damages. Further, thanks to the taper of the clamping surfaces provided on the tubular fit-in sleeve and inside the ring nut, pipes with different thicknesses may be connected by using the same type of pipe fitting element. A further advantage finally consists in that a smaller number of types of pipe fitting elements is industrially produced, whereby production is simplified and costs are reduced.

The further characteristics and possible improvements of the invention will form the subject of the dependent claims.

The characteristics of the invention and the advantages derived therefrom will appear more clearly from the following detailed description of the accompanying figures, in which:

BRIEF DESCRIPTION OF THE DRAWINGS

FIGS. 2, 3, 4 and 5 are exemplary side views of a straight connection joint having two pipe fitting elements according to the invention, the ring nut of one of these being in the extracted condition, whereas the ring nut of the opposite element is shown in tightened conditions on pipes of increasing thicknesses.

FIGS. 9 to 14 show several different variant embodiments, wherein a gasket is provided at the clamping surface of the sleeve and/or of the ring nut.

DETAILED DESCRIPTION OF THE PREFERRED EMBODIMENTS

Figure 1A:
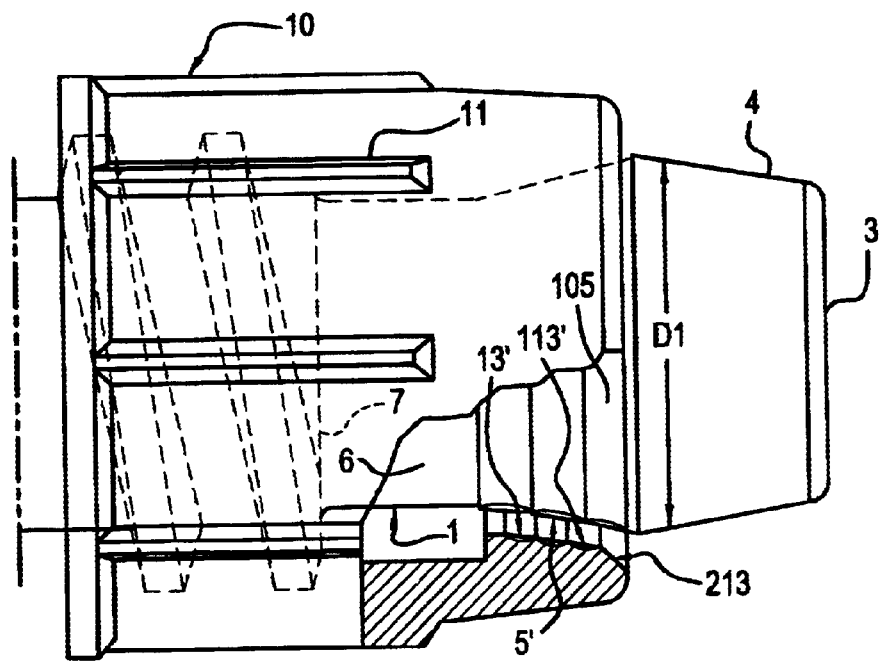
FIGS. 1A and 1B are side views of a pipe fitting element according to the invention in the open condition, i.e. with the ring nut being completely translated in the direction opposite to the tightening direction.

Referring to the figures, a pipe fitting element in accordance with the invention comprises a tubular sleeve 1 fitting into a free end of a pipe 2 to be connected. The pipe fitting element which forms the subject of this invention is particularly suitable for being used in combination with plastic pipes, thanks to the advantageous deformability characteristics provided by this material, but the use thereof is not to be intended solely restricted to the combination with pipes made of this material.

This tubular sleeve 1 has a preferably cylindrical inner axial space 3, for the passage of the fluid carried by the pipe 2. The tubular sleeve 1 has a maximum diameter D1, which is substantially equal to, particularly slightly greater than the inside diameter of the end of the pipe 2 to be connected, so as to allow the insertion of the sleeve 1 into the end of the pipe 2 with a slight resistance. This sleeve 1 further comprises, at the end part towards the pipe 2 to be connected, a section 4 which tapers towards the pipe 2, to facilitate insertion of the sleeve 1 into the pipe 2. The axial extension of this section 4 and its external shape may anyway be arranged to be different from those of the truncated cone-shaped section 4.

Immediately upstream of the truncated-cone shaped section 4, with respect to the direction of insertion of the sleeve 1 into the end of the pipe 2, there is provided the clamping surface 5 which is designed to be in contact with the inner wall of the pipe 2, when the pipe fitting element is in the mounted condition. In the figures, the truncated cone-shaped section 4 and the clamping surface 5 are arranged to be adjacent, but an intermediate tubular, for example cylindrical, section may be provided, having the function, for example, to strengthen the connection area.

This clamping surface 5 consists of a succession of widenings of the outside diameter of the sleeve 1 in the direction of insertion into the pipe 2 and particularly consists of a plurality of truncated cone-shaped annular surfaces 105 having equal tapers. In the figures, there are three annular truncated cone-shaped surfaces 105, but their number may vary also depending on the axial extension of this clamping surface 5 and/or on its total steepness. The larger base of each truncated cone has a diameter which is slightly smaller than the one of the smaller base of the adjacent truncated cone, with respect to the direction of insertion of the sleeve 1, whereby the clamping surface 5 consists of a succession of step-like widenings 105 which form a stepped surface 5 for gripping to the inner surface of the pipe 2, as will be described in greater detail below.

Figure 1B:
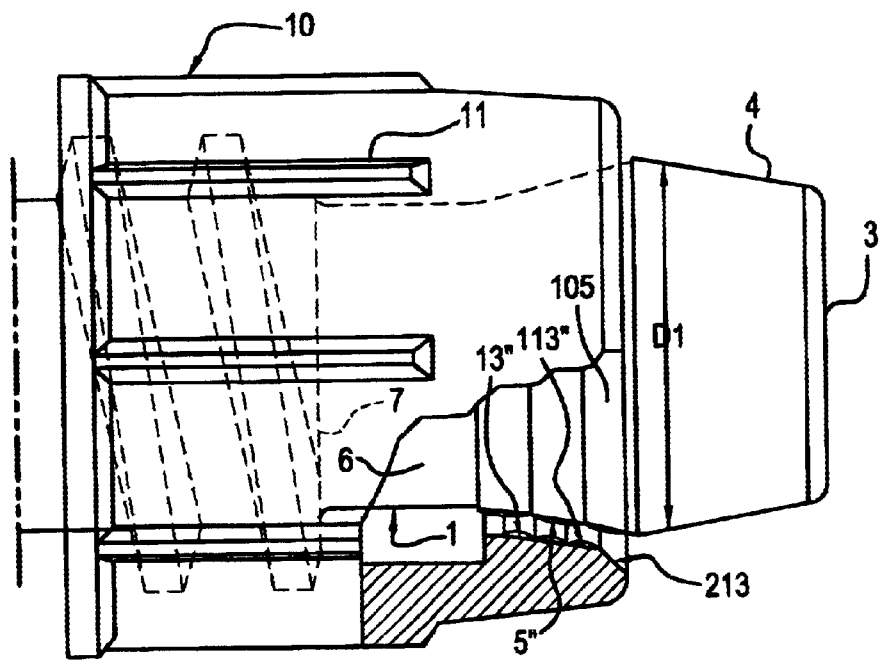
Figure 6:
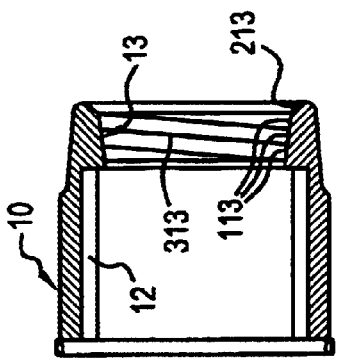
FIG. 6 shows an enlarged half of a joint.
Figure 7:
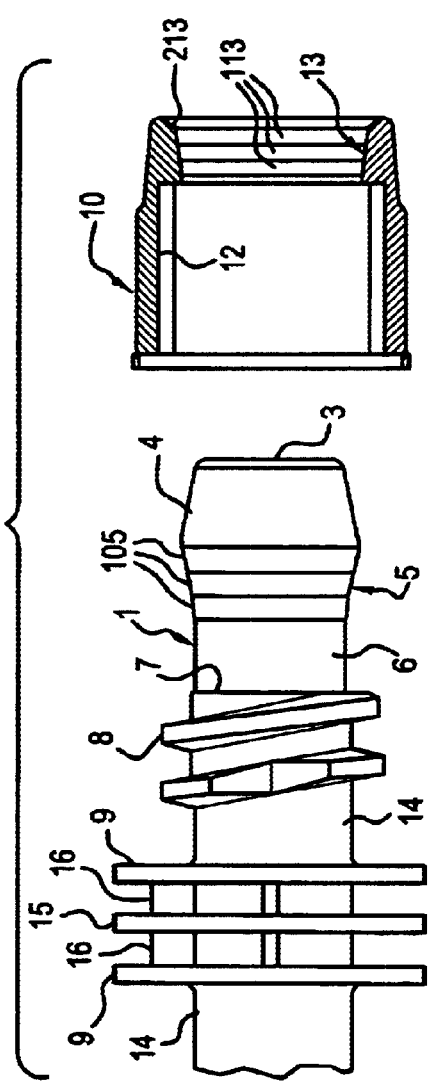
FIG. 7 is a view like the ones of FIGS. 2 to 5 with the ring nuts being removed.

The sleeve 1 also has a cylindrical section 6 ending at an annular radial shoulder 7 which forms an abutment or end-of-stroke surface for the pipe 2 threaded onto the sleeve 1 (see FIG. 2 and following figures). A threaded section 8 starts from the shoulder 7 and ends at another radial shoulder, formed by an annular end-of-stroke flange 9 for the ring nut 10 in the unscrewed/opened condition (FIG. 1).

The ring nut 10 is coaxial to the tubular sleeve 1, and has on its outer surface a plurality of projecting elements, in the form of axial ribs or crests 11 to facilitate the grip for tightening it by hand or with the help of a tool. On the inner surface, the ring nut 10 has a threaded section 12, whose thread matches the one 8 provided on the outer surface of the tubular sleeve 1. Downstream of said threaded section 12, with respect to the tightening direction, there is provided the clamping surface 13 of the ring nut 10, which is designed to be in contact with the outer wall of the pipe 2, when the pipe fitting element is in the mounted condition. This clamping surface 13 of the ring nut 10 consists of a plurality of step-like widenings 113, which are progressive in the tightening direction. Like in the first clamping surface 5, these widenings 113 also consist of a plurality of annular truncated cone-shaped surfaces, but in this case they have decreasing steepnesses with respect to the tightening direction so that it may be stated that the two clamping surfaces 5, 13 have substantially conical enveloping surfaces, and that the clamping surface 13 of the ring nut 10 has a less steep enveloping surface than the enveloping surface of the clamping surface 5 provided on the sleeve 1. As noted above, the steps 105, 113 of said clamping surfaces 5, 13 may be equal or different in number along the same axial length, in radial projection and in radial length. It may further be arranged that these clamping surfaces 5, 13 have each, at least partly, a shape differing from the one described above, e.g. concave 5' 13' 113' (FIG. 1A) or convex 5" 13" 113" (FIG. 1B), with equal or different concavities/convexities, and with the same or different directions, and even possibly cylindrical.

The outermost truncated cone-shaped surface of the ring nut has a much lower steepness than all the others, thereby forming a widening flare 213 to facilitate insertion of the pipe 2 into the ring nut 10. To this end, the diameter of the ring nut 10 on the side wherein the pipe 2 is inserted is substantially identical to or slightly greater than the outside diameter of the pipe 2 threaded on the tubular sleeve 1.

FIGS. 2 to 5 show a straight joint for axial connection of two free ends of pipe 2. This joint has a tubular, particularly cylindrical body 14, and at each opposite end thereof there is provided a pipe fitting element according to the invention. In the figures, this tubular body 14 is straight-shaped, but it may also have a different shape, e.g. for providing curved fitting joints. The tubular sleeves 1 of each pipe fitting element are part of the tubular body 14 of the joint, or axial extensions thereof.

In the intermediate portion between the two pipe fitting elements, the tubular body 14 has an element for gripping the joint, by hand or with the help of a tool, so that the introduction of the sleeves 1 and the tightening of the ring nuts 10 are facilitated. This gripping element consists of the two end-of-stroke flanges 9 for the two ring nuts 10 in the retracted/unscrewed condition, and of a third intermediate flange 15 having the same characteristics as the other two. The three flanges 9, 15 are interconnected by axial strengthening ribs 16. The above described gripping element, which also has the function to strengthen the central part of the joint, may also have any other shape deemed to be suitable, e.g. a transverse polygonal section, or even be missing.

In the figures, no pipe is connected to one of the pipe fitting elements, and the ring nut 10 is shown in the position in which it is wholly extracted from its sleeve 1. In the operating condition, the ring nut 10 is threaded on the sleeve 1. This may occur thanks to the fact that its minimum diameter is slightly greater than the maximum diameter of the sleeve. However, in order to ensure that very thin-walled pipes are clamped in a tight manner and with a sufficient mechanical strength, advantages are obtained from arranging that the minimum inside diameter of the ring nut and the outside maximum diameter of the sleeve are substantially identical, or anyway that the outside maximum diameter of the sleeve is slightly greater than the minimum inside diameter of the ring nut. The use of an intrinsically yielding material allows to force the ring nut into the operating position onto the sleeve, when it has to be threaded thereon, whereas the slight interference allows to effectively clamp in a tight manner and with mechanical firmness pipes with very thin walls. In the operating condition, the ring nut 10 is threaded on the sleeve 1, and wholly tightened so as to be completely translated towards its end-of-stroke flange 9.

Here, the sleeve 1 can be inserted into the end of the plastic pipe 2, with a slight deformation 102 thereof due to the maximum diameter D1 of the sleeve being slightly greater than the inside diameter of the pipe 2. The sleeve 1 penetrates the pipe 2 until the latter abuts against the annular radial shoulder 7 of the sleeve 1. Now, the ring nut 10 is translated by being tightened towards the end of the pipe 2, the two clamping surfaces 5, 13 are drawn progressively closer to each other until the clamping surface 13 of the ring nut 10 comes in contact with the outer surface of the pipe 2, clamping it against the clamping surface 5 of the sleeve 1. It has to be noted that the pipe 2 is clamped between annular surfaces which are part of the two clamping surfaces 5, 13 and that, as the thickness of the pipe to be connected 2 increases, clamping between the ring nut 10 and the sleeve 1 occurs at decreasing diameters of the two clamping surfaces 5, 13, hence different portions thereof adhere to the pipe. The different tapering angles of the ring nut and of the sleeve ensure a progressive clamping of the pipe, which is hence clamped in a gradual manner. By this arrangement, pipes with different thicknesses can be connected by the same pipe fitting element, without replacing the ring nut 10 and/or the sleeve 1. The steps 105, 113 provided on the two clamping surfaces 5, 13 exert on the inner and outer surfaces of the pipe a gripping action and prevent it from unthreading therefrom. Where the deformability of the plastic material of the pipe 2 allows to do so, these steps 105, 113 may form small steps on the surfaces of the pipe, i.e. little notches for restraining the pipe 2. As is clearly shown in the figures, clamping occurs with a non excessive deformation of the pipe 2, while the possibility of cuts or ruptures thereof is avoided and the sealing action of the pipe fitting element is improved as compared with prior art ones, which have a single cylindrical step.

FIGS. 2 to 5 show, by way of example, the pipe fitting element according to the invention in combination with pipes having different thicknesses. However, it has to be noted that the joint in accordance with the invention may also be used for pipes having even slightly differing diameters.

Figure 8:
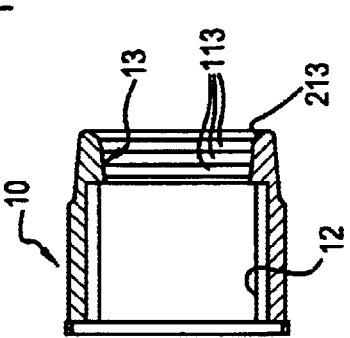
FIG. 8 is an enlarged detail of a ring nut according to a variant embodiment of the invention.

According to a variant embodiment of the invention as shown in FIG. 8, the clamping surface 113 inside the ring nut 10 may be defined by a continuous surface having a helical form with a progressively decreasing diameter. Particularly, the different annular portions of the clamping surface 13 of the ring nut 10 are separated by a conical helical line 313.

The clamping surfaces 113 may be either conical or cylindrical. In the latter case, a stepped narrowing or form will be provided. Nevertheless, the stepped form is also applicable to conical surfaces 113. In this case, a continuous helical step is provided, with a progressively decreasing diameter, particularly in the direction opposite to the pipe to be clamped.

It may be arranged that the helical surface has a variable pitch or that a multiple helical surface is provided in the form of a multi-start thread.

The left- or right-hand helical surface is selected in accordance with the thread for coupling the ring nut to the sleeve and in such a manner that, when the ring nut is tightened on the sleeve, the helical clamping surface is also tightened on the pipe to be clamped.

In accordance with a variant of this embodiment, which is not shown in detail but may be clearly understood by those skilled in the art based on the above description, the clamping surface 13 inside the ring nut 10 may also consist of an internal cylindrical or conical thread. This thread may have a helical tooth with any section. The thread may have a variable pitch. The thread may also be of the multi-start type.

The clamping surface 5 of the tubular sleeve 1 may be also provided in accordance with the variant of FIG. 8, and this alternatively to or in combination with an identical or similar construction of the clamping surface 13 of the ring nut.

The pipe fitting element which forms the subject of the present invention finds specific application in the conduction of fluids, particularly water, and particularly for irrigation fluids, but may be also used in other types of systems, e.g. designed for the supply of gas, oil or the like or for pneumatic systems.

With reference to the variant of FIGS. 9 and 10, a gasket 30 is associated to the clamping surface 5 of the tubular sleeve 1. The gasket 30, for instance made of rubber or of a plastic material similar to rubber, is in this case in the form of an O-ring.

The illustrated embodiment provides, without limitation, but as a preference, the application of the gasket 30 in the connection area between the clamping surface 5 of the tubular sleeve 1 and the end narrowing 4.

In the case of FIG. 9, the gasket is accommodated in a groove formed in the step 105 with the maximum diameter and projects therefrom, forming a further step.

However, in the case of FIG. 10, the gasket rests axially against a step 31, formed in the portion with the maximum diameter of the end conical taper 4 and forms at the same time a progressive widening, or the only progressive widening of the sleeve towards said portion with the maximum diameter of the end taper.

FIGS. 11 and 12 show the use of a gasket 30' having a polygonal, particularly square section. In this case, FIG. 11 shows a situation like that shown in FIG. 9, whereas FIG. 12 shows a conical portion of the clamping surface 5 of the tubular sleeve which ends by the step formed by the gasket 30'.

In both cases, the gasket 30' forms the last widening step of the clamping surface of the tubular sleeve 1.

Obviously, the solutions as shown and described for the O-ring also apply to the gasket with a square or polygonal section and vice versa.

FIGS. 13 and 14 show a pipe fitting in which both the tubular sleeve 1 and the ring nut 10 are provided with a gasket.

The gasket may be also only provided on the ring nut 10 and not on the tubular sleeve 1.

The position of the gasket 30 and 30' on the tubular sleeve is as shown in the previous figures.

The gasket 32 associated to the ring nut 20 is accommodated either in a groove formed in the radially narrowest portion of the clamping surface 13 as shown in FIG. 13, with a non limiting reference to the O-ring gasket 32, or said gasket is axially adjacent to the clamping surface 13 of the ring nut 10 on the inner side thereof and abuts against an inner step 33 formed by said clamping surface 13. In the example as shown in FIG. 14, the gasket still forms the annular band with the smallest diameter of the clamping surface 13. As noted herein for the tubular sleeve 1, the two embodiments are applicable indifferently both for O-ring gaskets 32 and for gaskets having a polygonal, particularly square section 32'.

The invention is not limited to the embodiments described herein but may be greatly varied. For example, the clamping surfaces may consist of a succession of cylindrical step-like widenings. Also, the fitting element may be made of one piece or applied or screwed or clamped in any other manner to the inlet and/or outlet of a line or of a device or of a hydraulic or pneumatic component, such as a cock, a valve, a counter, or the like. Further, a joint may be provided for connection of three or more pipe ends, by arranging that the sleeves are stably interconnected or interconnectable. The outside diameters of the sleeves of the pipe fitting elements provided on the joints may have the same diameter or different diameters. The joint may have different connecting means at one of its ends, such as a traditional thread. All this without departure from the guiding principle disclosed above and claimed below.

What is claimed is:

1. A pipe fitting apparatus for coupling comprising a pine having at least one pipe section, an end on the pine section, a tubular fit-in sleeve for fitting into the end of the pipe section, a clamping ring nut coaxial with the sleeve, internal threads in the ring nut and complementary external threads on at least one Dart of the sleeve, a clamping surface in the ring nut and a complementary clamping surface on the sleeve facing each other for tightly clamping the pipe and for mechanically restraining the pipe on the sleeve, the complementary clamping surface on the sleeve being in contact with an inner wall of the pipe and the clamping surface inside the ring nut being in contact with an outer wall of the nine when the pine fitting element is in a mounted condition, tightening of said internal and external threads allowing for the pipe to be clamped and for translation of the ring nut towards an end of the sleeve inside the pipe by simultaneously drawing the clamping surface and the complementary clamping surface mutually closer, and the clamping surface in the ring nut and the complementary clamping surface comprising a progressive widening on the sleeve correspond to an outside diameter comprising a progressive widening of the sleeve and an inside diameter comprising and progressive widening of an end of the ring nut facing the pipe to be connected, wherein the clamping surface inside the ring nut and the complementary clamping surface on the sleeve have tapers oriented in a same direction.

2. The apparatus of claim 1, wherein the pipe is a plastic pipe.

3. The apparatus of claim 1, wherein the widening of the outside diameter of the sleeve and of the inside diameter of the end of the ring nut are progressive in a tightening direction of the ring nut.

4. The apparatus of claim 3, further comprising annular surfaces on the ring nut and the sleeve, wherein clamping occurs between the annular surfaces of the ring nut and the sleeve at the progressive widening for clamping the pipe with a non-excessive deformation thereof.

5. The apparatus of claim 4, further comprising a plurality of pipes having equal diameters, wherein the pipe fitting apparatus forms a coupling for the plurality of pipes.

6. The apparatus of claim 4, further comprising a plurality of pipes having different diameters, wherein the pipes fitting apparatus forms a coupling for the plurality of pipes.

7. The apparatus of claim 6, wherein the pipes have variable wall thickness.

8. The apparatus of claim 1, wherein the progressive widening of the sleeve and of the ring nut have a progression forming substantially shaped clamping surfaces.

9. The apparatus of claim 8, wherein the shaped clamping surfaces have substantially conical enveloping surfaces.

10. The apparatus of claim 1, wherein the clamping surfaces inside the ring nut and the complementary clamping surface on the sleeve have differing tapers.

11. The apparatus of claim 1, wherein the clamping surfaces inside the ring nut and the complementary clamping surface on the sleeve have diverging tapers.

12. The apparatus of claim 1, wherein at least one of the clamping surface or the complementary clamping surface comprises a succession of step-like widening.

13. The apparatus of claim 12, wherein the clamping surface and the complementary clamping surface both comprise step-like widening.

14. The apparatus of claim 13, wherein the step-like widening comprise steps on the sleeve and inside the ring nut.

15. The apparatus of claim 14, wherein the steps are equal in number over a same axial length, in radial project on and in axial length.

16. A pipe fitting apparatus for coupling comprising a pipe having at least one pipe section, an end on the pipe section, a tubular fit-in sleeve for fitting into the end of the ripe section, a clamping ring nut coaxial with the sleeve, internal threads in the ring nut and complementary external threads on at least one Dart of the sleeve, a clamping surface in the ring nut and a complementary clamping surface on the sleeve facing each other for tightly clamping the pipe and for mechanically restraining the pipe on the sleeve, the complementary clamping surface on the sleeve being in contact with an inner wall of the pipe and the clamping surface inside the ring nut being in contact with an outer wall of the pipe when the pipe fitting element is in a mounted condition, tightening of said internal and external threads allowing for the pipe to be clamped and for translation of the ring nut towards an end of the sleeve inside the pipe by simultaneously drawing the clamping surface and the complementary clamping surface mutually closer, and the clamping surface in the ring nut and the complementary clamping surface on the sleeve corresponding to an outside diameter of the sleeve and an inside diameter of an end of the ring nut facing the pipe to be connected, wherein the clamping surface and the complementary clamping surface both comprise steps on the sleeve and inside the ring nut, and wherein the steps are different in number over a same axial length, in radial projection and in axial length.

17. The apparatus of claim 14, wherein the step-like widening comprise a plurality of shaped annular surface.

18. The apparatus of claim 17, wherein the shaped annular surfaces are cylindrical.

19. The apparatus of claim 17, wherein the shaped annular surfaces are truncated cones.

20. The apparatus of claim 17, wherein the annular surfaces have equal taperings.

21. A pipe fitting apparatus for coupling comprising a pipe having at least one pipe section, an end on the pipe section, a tubular fit-in sleeve for fitting into the end of the pipe section, a clamping ring nut coaxial with the sleeve, internal threads in the ring nut and complementary external threads on at least one part of the sleeve, a clamping surface in the ring nut and a complementary clamping surface on the sleeve facing each other for tightly clamping the pipe and for mechanically restraining the pipe on the sleeve, the complementary clamping surface on the sleeve being in contact with an inner wall of the pipe and the clamping surface inside the ring nut being in contact with an outer wall of the pipe when the pipe fitting element is in a mounted condition, tightening of said internal and external threads allowing for the pipe to be clamped and for translation of the ring nut towards an end of the sleeve inside the pipe by simultaneously drawing the clamping surface and the complementary clamping surface mutually closer, and the clamping surface in the ring nut and the complementary clamping surface on the sleeve corresponding to an outside diameter of the sleeve and an inside diameter of an end of the ring nut facing the pipe to be connected, wherein the annular surfaces have different taperings.

22. The apparatus of claim 1, wherein the complementary clamping surface on the sleeve comprises a plurality of annular surfaces.

23. The apparatus of claim 22, wherein the annular surfaces are cylindrical.

24. The apparatus of claim 22, wherein the annular surfaces are truncated cones.

25. The apparatus of claim 22, wherein the annular surfaces have equal axial lengths.

26. The apparatus of claim 22, wherein the annular surfaces have equal steepnesses.

27. The apparatus of claim 1, wherein the clamping surface inside the ring nut comprises a plurality of annular surfaces.

28. The apparatus of claim 27, wherein the annular surfaces are cylindrical.

29. The apparatus of claim 27, wherein the annular surfaces are truncated cones.

30. The apparatus of claim 27, wherein the annular surfaces have equal axial lengths.

31. The apparatus of claim 27, wherein the annular surfaces are at least partly of decreasing steepness in a tightening direction.

32. The apparatus of claim 1, wherein the end of the ring nut comprises a portion having a widening flare towards a tightening direction for insertion of the end of the pipe and coupling of the pipe to the ring nut.

33. The apparatus of claim 32, wherein a diameter of the widening flare towards the direction of insertion is substantially identical to an outer diameter of the pipe.

34. The apparatus of claim 32, wherein a diameter of the widening flare towards the direction of insertion is slightly greater than an outer outside diameter of the pipe.

35. The apparatus of claim 1, wherein a maximum diameter of the sleeve is substantially equal to or slightly greater than a minimum diameter of the ring nut such that the ring nut is threadable on the sleeve from an end of the sleeve facing the pipe with a force sufficient to ensure an interference to obtain a tight and mechanically resistant clamping between plural pipes having varied wall thicknesses.

36. The apparatus of claim 1, wherein the sleeve comprises a surface for receiving the pipe.

37. The apparatus of claim 36, wherein the surface is an abutment.

38. The apparatus of claim 36, wherein the surface is end-of-stroke surface.

39. The apparatus of claim 36, wherein the surface comprises a step-like widening.

40. The apparatus of claim 36, wherein the surface comprises an annular radial shoulder.

41. The apparatus of claim 40, wherein the annular radial shoulder is disposed between a beginning of the complementary clamping surface and a beginning of the threaded portion on the sleeve.

42. The apparatus of claim 41, wherein the annular radial shoulder is proximal the threaded portion.

43. The apparatus of claim 1, wherein the sleeve comprises a tapering portion at an end turned towards the pipe for insertion of the sleeve into the pipe.

44. The apparatus of claim 1, wherein the clamping surface has at least a first partial shape and the complementary clamping surface has at least a second partial shape.

45. The apparatus of claim 44, wherein the first and the second shapes are convex.

46. The apparatus of claim 45, wherein the first and the second shapes have equal convexities.

47. The apparatus of claim 45, wherein the first and the second shapes have different convexities.

48. The apparatus of claim 44, wherein the first and the second shapes are in same directions.

49. The apparatus of claim 44, wherein the first and the second shapes are in different directions.

50. The apparatus of claim 1, wherein the pipe fitting apparatus is of one piece.

51. The apparatus of claim 50, wherein the pipe fitting apparatus is unitary.

52. The apparatus of claim 1, further comprising a line having an opening, wherein the pipe fitting apparatus is a coupling for connecting the line.

53. The apparatus of claim 52, wherein the opening is an inlet.

54. The apparatus of claim 52, wherein the opening is an outlet.

55. The apparatus of claim 52, wherein the coupling is connected to the opening in the line in a manner selected from the group consisting of applying, screwing on, clamping, attaching and combinations thereof.

56. The apparatus of claim 52, wherein the line is selected from the group consisting of a pipeline, a hydraulic device, a pneumatic device, a cock, a valve, a counter, and combinations thereof.

57. The apparatus of claim 1, wherein the sleeve comprises at least two ends, one end being insertable in the pipe and another end opposite to the one end comprising a coupling for coupling the sleeve to an inlet of a line.

58. The apparatus of claim 57, wherein the line is selected from the group consisting of a pipeline, a hydraulic device, a pneumatic device, and combinations thereof.

59. The apparatus of claim 1, further comprising at least one gasket on the sleeve cooperating with an inner surface of the pipe when fitted onto the sleeve.

60. The apparatus of claim 59, further comprising at least one gasket on an inner surface of the ring nut cooperating with the inner surface of the pipe fitted onto the sleeve.

61. The apparatus of claim 1, further comprising at least one gasket on the sleeve.

62. The apparatus of claim 61, further comprising a gasket in an end portion in the ring nut opposite to an end of the sleeve.

63. The apparatus of claim 62, wherein the end portion comprises a step-like narrow portion, wherein the gasket abuts axially against the narrow portion.

64. The apparatus of claim 63, further comprising an annular groove in the narrow portion for accommodating the gasket in the annular groove.

65. The apparatus of claim 64, wherein the gasket forms at least a part of the clamping surface of the ring nut.

66. The apparatus of claim 65, wherein the gasket forms at least a part of the complementary clamping surface of the sleeve.

67. A joint for connecting free ends of two pipe segments comprising a straight or curved tubular cylindrical body having opposite ends, at each of the ends comprising the pipe fitting apparatus of claim 1, wherein the sleeves of the pipe fitting apparatus form parts of the tubular body or extensions thereof.

68. The joint of claim 67, further comprising grasping means for the ring nuts in an unscrewed open condition.

69. The joint of claim 68, wherein the grasping means for the ring nuts comprises at least one annular radial flange or shoulder in a central portion of the tubular body between two of the pipe fitting apparatus.

70. The joint of claim 67, further comprising end-of-stroke means for the ring nuts in an unscrewed open condition.

71. The joint of claim 70, wherein the end-of-stroke means for the ring nuts comprises at least one annular radial flange or shoulder in a central portion of the tubular body between two of the pipe fitting apparatus.

72. The joint of claim 67, wherein the sleeves of the two pipe fitting apparatus have equal maximum outside diameters.

73. The joint of claim 67, wherein the sleeves of the two pipefitting apparatus have different diameters for connection of pipes with different diameters.

74. A joint for connecting two, three or more free ends of pipe segments comprising two, three or more of the pipe fitting apparatus of claim 1, wherein the sleeve of each apparatus is stably interconnectable.

75. The joint of claim 74, wherein the pipe fitting apparatus has equal maximum outside diameters.

76. The joint of claim 74, wherein the pipe fitting apparatus has different diameters.

77. The joint of claim 74, wherein the pipe segments are of plastic material.

78. A joint for connecting an end of a pipe to a threaded pipe end comprising a tubular body with one end being a threaded end with threads and another end comprising the pipe fitting apparatus of claim 1.

79. The joint of claim 78, wherein the pipe and pipe end are of plastic material.

80. The apparatus of claim 1, further comprising a hydraulic system having the pipe fitting apparatus of claim 1 integrally formed with the hydraulic system.

81. The apparatus of claim 1, further comprising a pneumatic system having the pipe fitting apparatus of claim 1 integrally formed with the pneumatic system.

82. A pipe fitting apparatus for coupling comprising a pipe having at least one pipe section, an end on the pipe section, a tubular fit-in sleeve for fitting into the end of the pipe section, a clamping ring nut coaxial with the sleeve, internal threads in the ring nut and complementary external threads on at least one part of the sleeve, a clamping surface in the ring nut and a complementary clamping surface on the sleeve facing each other for tightly clamping the pipe and for mechanically restraining the pipe on the sleeve, the complementary clamping surface on the sleeve being in contact with an inner wall of the pipe and the clamping surface inside the ring nut being in contact with an outer wall of the pipe when the pipe fitting element is in a mounted condition, tightening of said internal and external threads allowing for the pipe to be clamped and for translation of the ring nut towards an end of the sleeve inside the pipe by simultaneously drawing the clamping surface and the complementary clamping surface mutually closer, and the clamping surface in the ring nut and the complementary clamping surface on the sleeve corresponding to an outside diameter of the sleeve and an inside diameter of an end of the ring nut facing the pipe to be connected, wherein the clamping surfaces inside the ring nut and the complementary clamping surface on the sleeve have diverging tapers, wherein the diverging tapers comprise the clamping surface inside the ring nut having a lesser steep than the complementary clamping surface on the sleeve.

83. A pipe fitting apparatus for coupling comprising a pipe having at least one pipe section, an end on the pipe section, a tubular fit-in sleeve for fitting into the end of the pipe section, a clamping ring nut coaxial with the sleeve, internal threads in the ring nut and complementary external threads on at least one part of the sleeve, a clamping surface in the ring nut and a complementary clamping surface on the sleeve facing each other for tightly clamping the pipe and for mechanically restraining the pipe on the sleeve, the complementary clamping surface on the sleeve being in contact with an inner wall of the pipe and the clamping surface inside the ring nut being in contact with an outer wall of the pipe when the pipe fitting element is in a mounted condition, tightening of said internal and external threads allowing for the pipe to be clamped and for translation of the ring nut towards an end of the sleeve inside the pipe by simultaneously drawing the clamping surface and the complementary clamping surface mutually closer, and the clamping surface in the ring nut and the complementary clamping surface on the sleeve corresponding to an outside diameter of the sleeve and an inside diameter of an end of the ring nut facing the pipe to be connected wherein the clamping surface has at least a first partial shape and the complementary clamping surface has at least a second partial shape, and wherein the first and the second shape are concave.

84. The apparatus of claim 83, wherein the first and the second shapes have equal concavities.

85. The apparatus of claim 83, wherein the first and the second shapes have different concavities.

86. A Pipe fitting apparatus for coupling comprising a pipe having at least one pipe section, an end on the pipe section, a tubular fit-in sleeve for fitting into the end of the pipe section, a clamping ring nut coaxial with the sleeve, internal threads in the ring nut and complementary external threads on at least one part of the sleeve, a clamping surface in the ring nut and a complementary clamping surface on the sleeve facing each other for tightly clamping the pipe and for mechanically restraining the pine on the sleeve, the complementary clamping surface on the sleeve being in contact with an inner wall of the pipe and the clamping surface inside the ring nut being in contact with an outer wall of the pipe when the pipe fitting element is in a mounted condition, tightening of said internal and external threads allowing for the pipe to be clamped and for translation of the ring nut towards an end of the sleeve inside the pipe by simultaneously drawing the clamping surface and the complementary clamping surface mutually closer, and the clamping surface in the ring nut and the complementary clamping surface on the sleeve corresponding to an outside diameter of the sleeve and an inside diameter of an end of the ring nut facing the pipe to be connected, wherein the clamping surface of the ring nut comprises a first continuous surface having a first helical form with a progressively decreasing diameter.

87. The apparatus of claim 86, wherein the complementary clamping surface of the sleeve comprises a second continuous surface having a second helical form with a progressively decreasing diameter.

88. The apparatus of claim 87, wherein the clamping surface and the complementary clamping surface are conical.

89. The apparatus of claim 87, wherein the clamping surface and the complementary clamping surface are cylindrical.

90. The apparatus of claim 87, wherein the first and the second continuous helical surfaces comprise step-like narrowing forms.

91. The apparatus of claim 90, wherein the step-like narrowing forms are continuous helical steps with progressively decreasing diameter.

92. The apparatus of claim 91, wherein the progressively decreasing diameter is in a direction opposite to the pipe to be clamped.

93. The apparatus of claim 87, wherein a pitch of the first and the second helical forms are variable.

94. The apparatus of claim 87, wherein the first and the second helical forms comprise multiple helical surfaces formed as multi-start threads.

95. The apparatus of claim 87, wherein the helical form comprises plural helixes with helical surfaces extending in defined directions.

96. The apparatus of claim 95, wherein the directions are left-handed or right-handed directions.

97. The apparatus of claim 96, wherein a desired direction of the helical surfaces is selected corresponding to the threads of the ring nut for coupling the ring nut to the sleeve such that tightening the ring nut on the sleeve tightens the helical clamping surfaces on the pipe to be clamped.

98. A pipe fitting apparatus for coupling comprising a pipe having at least one pipe section, an end on the pipe section, a tubular fit-in sleeve for fitting into the end of the pipe section, a clamping ring nut coaxial with the sleeve, internal threads in the ring nut and complementary external threads on at least one part of the sleeve, a clamping surface in the ring nut and a complementary clamping surface on the sleeve facing each other for tightly clamping the pipe and for mechanically restraining the pipe on the sleeve, the complementary clamping surface on the sleeve being in contact with an inner wall of the pipe and the clamping surface inside the ring nut being in contact with an outer wall of the pipe when the pipe fitting element is in a mounted condition, tightening of said internal and external threads allowing for the pipe to be clamped and for translation of the ring nut towards an end of the sleeve inside the pipe by simultaneously drawing the clamping surface and the complementary clamping surface mutually closer, and the clamping surface in the ring nut and the complementary clamping surface on the sleeve corresponding to an outside diameter of the sleeve and an inside diameter of an end of the ring nut facing the pipe to be connected, wherein the clamping surface of the ring nut comprises an internal cylindrical or conical thread.

99. The apparatus of claim 98, wherein the complementary clamping surface of the sleeve comprises a cylindrical or conical thread.

100. The apparatus of claim 99, wherein the thread has a variable pitch.

101. The apparatus of claim 100, wherein the thread is a multi-start thread.

102. A pipe fitting apparatus for coupling comprising a pipe having at least one pipe section, an end on the pipe section, a tubular fit-in sleeve for fitting into the end of the pine section, a clamping ring nut coaxial with the sleeve, internal threads in the ring nut and complementary external threads on at least one part of the sleeve, a clamping surface in the ring nut and a complementary clamping surface on the sleeve facing each other for tightly clamping the pipe and for mechanically restraining the pipe on the sleeve, the complementary clamping surface on the sleeve being in contact with an inner wall of the pipe and the clamping surface inside the ring nut being in contact with an outer wall of the pipe when the pipe fitting element is in a mounted condition, tightening of said internal and external threads allowing for the pipe to be clamped and for translation of the ring nut towards an end of the sleeve inside the pipe by simultaneously drawing the clamping surface and the complementary clamping surface mutually closer, and the clamping surface in the ring nut and the complementary clamping surface on the sleeve corresponding to an outside diameter of the sleeve and an inside diameter of an end of the ring nut facing the pipe to be connected, further comprising sealing gaskets on the sleeve and on the ring nut cooperating with inner and outer surfaces respectively of the pipe coupled to the pipe fitting apparatus.

103. The apparatus of claim 102, wherein the sealing gaskets have polygonal shapes with square sections.

104. The apparatus of claim 102, wherein the sealing gaskets have circular shapes with round sections.

105. A pipe fitting apparatus for coupling comprising a pine having at least one pipe section, an end on the pipe section, a tubular fit-in sleeve for fitting into the end of the pipe section, a clamping ring nut coaxial with the sleeve, internal threads in the ring nut and complementary external threads on at least one part of the sleeve, a clamping surface in the ring nut and a complementary clamping surface on the sleeve facing each other for tightly clamping the pipe and for mechanically restraining the pipe on the sleeve, the complementary clamping surface on the sleeve being in contact with an inner wall of the pipe and the clamping surface inside the ring nut being in contact with an outer wall of the pipe when the pipe fitting element is in a mounted condition, tightening of said internal and external threads allowing for the pipe to be clamped and for translation of the ring nut towards an end of the sleeve inside the pipe by simultaneously drawing the clamping surface and the complementary clamping surface mutually closer, and the clamping surface in the ring nut and the complementary clamping surface on the sleeve corresponding to an outside diameter of the sleeve and an inside diameter of an end of the ring nut facing the pipe to be connected, at least one casket on the sleeve, and wherein the sleeve comprises a connection part or annular apex between an end taper and the complementary clamping surface adjacently disposed thereof and an annular groove on the connection part for accommodating the at least one gasket.

106. The apparatus of claim 105, wherein the at least one gasket forms a step for passage to an annular surface contiguous with a maximum diameter of the clamping surface of the sleeve.

* * * * *